US012779434B2

(12) United States Patent
Lugmair et al.

(10) Patent No.: US 12,779,434 B2
(45) **Date of Patent: *Nov. 3, 2026**

(54) WATER-GAS SHIFT REACTION CATALYSTS

(71) Applicant: CLARIANT INTERNATIONAL LTD, Muttenz (CH)

(72) Inventors: Claus G. Lugmair, Santa Cruz, CA (US); Robert J. O'Brien, Louisville, KY (US); Yangxue Gao, Mountain View, CA (US); Hongyi Hou, Sunnyvale, CA (US)

(73) Assignee: CLARIANT INTERNATIONAL LTD, Muttenz (CH)

( * ) Notice: Subject to any disclaimer, the term of this patent is extended or adjusted under 35 U.S.C. 154(b) by 689 days.

This patent is subject to a terminal disclaimer.

(21) Appl. No.: 18/200,139

(22) Filed: May 22, 2023

(65) Prior Publication Data

US 2023/0398518 A1 Dec. 14, 2023

Related U.S. Application Data

(60) Provisional application No. 63/350,757, filed on Jun. 9, 2022.

(51) Int. Cl.

| | |
|---|---|
| ***B01J 21/00*** | (2006.01) |
| ***B01J 21/04*** | (2006.01) |
| ***B01J 23/06*** | (2006.01) |
| ***B01J 23/22*** | (2006.01) |
| ***B01J 23/72*** | (2006.01) |
| ***B01J 23/745*** | (2006.01) |
| ***B01J 23/75*** | (2006.01) |
| ***B01J 23/80*** | (2006.01) |
| ***B01J 37/02*** | (2006.01) |
| ***B01J 37/03*** | (2006.01) |
| ***B01J 37/06*** | (2006.01) |
| ***B01J 37/08*** | (2006.01) |
| ***C01B 3/16*** | (2006.01) |

(52) U.S. Cl.

CPC ............. *B01J 21/005* (2013.01); *B01J 21/04* (2013.01); *B01J 23/06* (2013.01); *B01J 23/22* (2013.01); *B01J 23/72* (2013.01); *B01J 23/745* (2013.01); *B01J 23/75* (2013.01); *B01J 37/0236* (2013.01); *B01J 37/031* (2013.01); *B01J 37/06* (2013.01); *B01J 37/08* (2013.01); *B01J 2235/15* (2024.01)

(58) Field of Classification Search

CPC . B01J 21/005; B01J 21/04; B01J 23/06; B01J 23/22; B01J 23/72; B01J 23/745; B01J 23/75; B01J 37/0236; B01J 37/031; B01J 37/06; B01J 37/08; B01J 23/80; B01J 2235/15; Y02P 20/52; C01B 3/16

See application file for complete search history.

(56) References Cited

U.S. PATENT DOCUMENTS

| | | | | |
|---|---|---|---|---|
| 6,913,739 | B2 | 7/2005 | Ruettinger | |
| 7,166,263 | B2 | 1/2007 | Vanderspurt | |
| 7,964,114 | B2 * | 6/2011 | Chen | C01B 3/16 502/343 |
| 7,998,897 | B2 * | 8/2011 | Schiodt | B01J 37/03 502/343 |
| 8,119,099 | B2 * | 2/2012 | Schiodt | B01J 23/005 423/655 |
| 8,404,156 | B2 | 3/2013 | Schioedt | |
| 10,464,049 | B2 | 11/2019 | Faure | |
| 11,097,944 | B2 | 8/2021 | Pach | |
| 11,498,835 | B2 | 11/2022 | Rostrup-Nielsen | |
| 2001/0055560 | A1 | 12/2001 | Schiodt | |
| 2010/0029207 | A1 | 2/2010 | Yang et al. | |

FOREIGN PATENT DOCUMENTS

| | | | |
|---|---|---|---|
| CN | 101745404 | 6/2010 | |
| CN | 103263929 | 8/2013 | |
| EP | 3254760 | 12/2017 | |
| JP | 2004321924 | 11/2004 | |
| JP | 2004329976 | 11/2004 | |
| WO | 2022112310 | 6/2022 | |
| WO | WO-2022112310 A1 * | 6/2022 | B01J 35/37 |

OTHER PUBLICATIONS

Habibi et al., J. of Molecular Structure, (2021), v.1228, p. 129769(1-10).*

Abolfazl et al., China Petroleum Proc. and Petrochem Tech., (2016), 18(1), p. 51-58.*

* cited by examiner

*Primary Examiner* — Yong L Chu

(57) ABSTRACT

The present disclosure related generally to a high-temperature water-gas shift catalyst composition comprising: a ZnO phase, present in the composition in an amount of 5-70 wt. %; a zinc-aluminum spinel phase, present in the composition in an amount of 30-95 wt. %; wherein the molar ratio of Zn atoms to Al atoms in the catalyst composition is at least 1:1.

50 Claims, 2 Drawing Sheets

| Catalyst | Zn/Al | Fe wt% |
|---|---|---|
| E4-spent | 1.5 | 0 |
| E7-spent | 1 | 10.5 |
| E8-spent | 1.9 | 6.2 |
| E9-spent | 1.6 | 2.8 |

WATER-GAS SHIFT REACTION CATALYSTS

CROSS-REFERENCE TO RELATED APPLICATIONS

This application claims priority to U.S. Provisional Patent Application Ser. No. 63/350,757 filed Jun. 9, 2022, which is incorporated herein by reference in its entirety.

BACKGROUND OF THE DISCLOSURE

Field of the Disclosure

This disclosure relates generally to water-gas shift reaction catalyst materials. More particularly, the present disclosure relates to spinel-comprising catalysts useful in high-temperature water-gas shift reactions, to methods for making such catalysts, and to methods for forming hydrogen with such catalysts.

Technical Background

The water-gas shift reaction is a well-known reaction through which hydrogen is formed from water vapor and carbon monoxide. Large volumes of hydrogen gas are needed for a number of important chemical reactions. Since the 1940s, the water-gas shift reaction has represented an important step in the industrial production of hydrogen. For example, an industrial-scale water-gas shift reaction is used to increase the production of hydrogen for refinery hydroprocesses and for use in the production of bulk chemicals such as ammonia, methanol, and alternative hydrocarbon fuels.

Conventionally, the catalysts used in industrial-scale water-gas shift reactions include either an iron-chromium metal combination or a copper-zinc metal combination. The iron-chromium oxide catalyst is typically used in high-temperature shift (HTS) converters, which typically have reactor inlet temperatures in the range of about 300° C. to about 380° C. Conventional HTS converters use iron-based catalysts. Typically, conventional catalysts are supplied in the form of pellets containing 8%-12% $Cr_2O_3$ and a small amount of copper as an activity and selectivity enhancer.

However, chromium can be toxic and carcinogenic, and therefore highly undesirable for use on an industrial scale due to health and environmental concerns. Moreover, iron-containing HTS catalysts are only operable under a limited range of steam-to-gas ratios (S/G; i.e., the molar ratio of $H_2O$ to the total of $H_2$, $N_2$, $CO_2$, and CO), because at low S/G, the catalyst is reduced to iron carbides, which produce hydrocarbon byproducts.

Accordingly, there remains a need for water-gas shift reaction catalysts that can be prepared without chromium and optionally without iron, without significantly affecting performance. There further remains a need for water-gas shift reaction catalysts that can be operated at a wider S/G range than that afforded by conventional catalysts.

SUMMARY

The present inventors have determined that a catalyst based on a zinc-aluminum spinel phase with a significant amount of a ZnO phase can provide high-temperature activity and stability at low cost and without the negative environmental impact of using significant amounts of chromium. Accordingly, one aspect of the disclosure provides a high-temperature water-gas shift catalyst composition comprising:

- a ZnO phase, present in the composition in an amount of 5-70 wt. %;
- a zinc-aluminum spinel phase, present in the composition in an amount of 30-95 wt. %;
- wherein the molar ratio of Zn atoms to Al atoms in the catalyst composition is at least 1:1.

In various embodiments, the catalyst composition further includes low to no amounts of any crystalline $Al_2O_3$ phase.

Another aspect of the disclosures provides a method for preparing a high temperature water-gas shift catalyst composition as described herein. The method includes comprising:

- providing an aqueous precursor solution comprising zinc ions and aluminum ions;
- precipitating a solid catalyst precursor comprising salts of zinc, aluminum and if present, promoter ions, from the aqueous precursor solution; and then
- calcining the solid catalyst precursor to provide the catalyst composition.

Another aspect of the disclosure provides a method for performing a water-gas shift reaction, comprising contacting a feed comprising water and carbon monoxide with a water-gas shift catalyst composition as described herein to form hydrogen and carbon dioxide.

DETAILED DESCRIPTION

Figure 1:
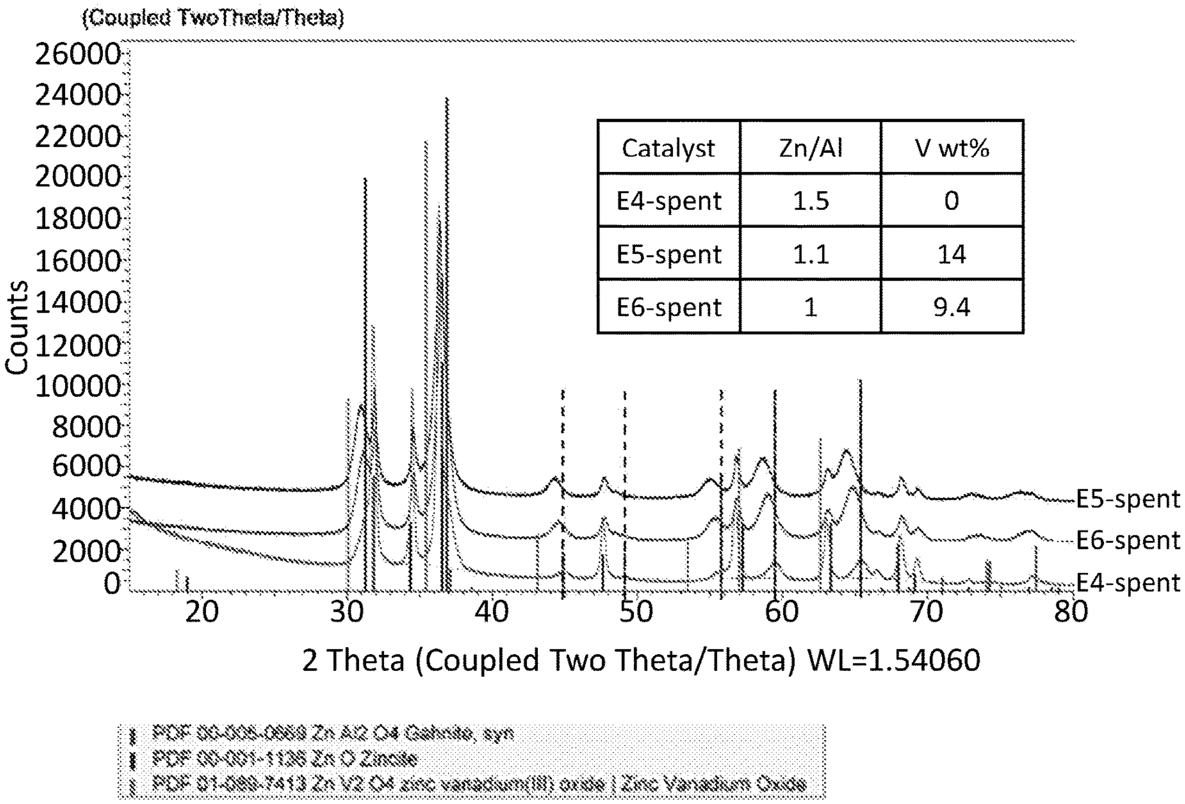
FIG. 1. is a plot of the X-ray diffraction (XRD) patterns of certain materials described herein.

The present disclosure is concerned with water-gas shift catalyst compositions that include at least zinc, aluminum and oxygen, with a significant amount of zinc-aluminum spinel and a significant amount of zinc oxide. The disclosure demonstrates that such catalysts, which can advantageously be substantially free of chromium, can exhibit good activity in water-gas shift reactions, especially high-temperature water-gas shift reactions.

Thus, one aspect of the disclosure is a high temperature water-gas shift catalyst composition comprising:

- a zinc-aluminum spinel phase, present in the composition in an amount of 30-95 wt. %; and
- a ZnO phase, present in the composition in an amount of 5-70 wt. %;
- wherein the molar ratio of Zn atoms to Al atoms in the catalyst composition is at least 1:1.

Amounts of phases for the purposes of this disclosure are determined using x-ray diffraction, using the Rietveld refinement. Amounts of phases are recited as a fraction of the crystalline As noted above, zinc-aluminum spinel phase is present in the composition of this aspect in an amount of 30-95 wt. %. In various embodiments as otherwise described herein, the zinc-aluminum spinel phase is present in the composition in an amount within the range of 30-90 wt. %, e.g., 30-85 wt. %, or 30-80 wt. %, or 30-75 wt. %, or 30-70 wt. %. In various embodiments as otherwise described herein, the zinc-aluminum spinel phase is present in the composition in an amount within the range of 40-95 wt. %, e.g., 40-90 wt. %, or 40-85 wt. %, or 40-80 wt. %, or 40-75 wt. %, or 40-70 wt. %. In various embodiments as otherwise described herein, the zinc-aluminum spinel phase is present in the composition in an amount within the range of 45-95 wt. %, e.g., 45-90 wt. %, or 45-85 wt. %, or 45-80 wt. %, or 45-75 wt. %, or 45-70 wt. %. In various embodiments as otherwise described herein, the zinc-aluminum spinel phase is present in the composition in an amount within the range of 50-95 wt. %, e.g., 50-90 wt. %, or 50-85 wt. %, or 50-80 wt. %, or 50-75 wt. %, or 50-70 wt. %.

The zinc-aluminum spinel phase can be provided with a variety of crystallite sizes. In various embodiments, the zinc-aluminum spinel phase of the composition as described herein has an average crystallite size in the range of 1-100 nm. For example, in various embodiments the zinc-aluminum spinel phase has an average crystallite size of 1-75 nm, or 1-50 nm, or 1-30 nm, or 5-100 nm, or 5-75 nm, or 5-50 nm, or 5-30 nm, or 10-100 nm, or 10-75 nm, or 10-50 nm, or 25-100 nm, or 25-75 nm, or 50-100 nm. A smaller crystallite size of the zinc-aluminum spinel phase can be correlated to a higher surface area and can provides higher catalytic activity.

As noted above, a ZnO phase is present in the composition of this aspect in an amount within the range of 5-70 wt. %. The amount of the ZnO phase in the catalyst composition of the disclosure can vary within this range. For example, in various embodiments as otherwise described herein, the ZnO phase is present in an amount within the range of 5-60 wt. %, e.g., 5-50 wt. %, or 5-40 wt %. In various embodiments as otherwise described herein, the ZnO phase is present in the composition within the range of 25-75 wt. %, e.g., in the range of 5-70 wt. %, e.g., 15-60 wt. %, or 15-50 wt. %, or 15-40 wt %. In various embodiments as otherwise described herein, the ZnO phase is present in the composition in the range of 25-70 wt. %, e.g., 25-60 wt %, or 25-50 wt %, or 25-40 wt %. In various embodiments as otherwise described herein, the ZnO phase is present in the composition within the range of 30-70 wt. %, e.g., 30-60 wt %, or 30-55 wt %, or 30-50 wt %. In various embodiments as otherwise described herein, the ZnO phase is present in the composition within the range of 35-70 wt. %, e.g., 35-65 wt %, or 35-60 wt %, or 35-65 wt %.

In various embodiments as otherwise described herein, the ZnO phase in the composition as otherwise described herein has an average crystallite size in the range of 1-100 nm. For example, in various embodiments the ZnO phase has an average crystallite size of 1-75 nm, or 1-50 nm, or 1-30 nm, or 5-100 nm, or 5-75 nm, or 5-50 nm, or 5-30 nm, or 10-100 nm, or 10-75 nm, or 10-50 nm, or 25-100 nm, or 25-75 nm, or 50-100 nm. Having a higher surface area can provide a greater total catalytic surface area, and thus can lead to an overall higher catalytic activity.

As zinc-aluminum spinel itself has an idealized chemical formula of $ZnAl_2O_4$, it can be desirable to select a ratio of zinc to aluminum that, together with other elemental components, provides a desired amount of a spinel structure. Accordingly, in this aspect of the disclosure, the molar ratio of Zn atoms to Al atoms in the catalyst composition is at least 1:1. In order to provide a significant amount of ZnO, as described herein, it can be desirable to provide zinc in a molar excess of the amount necessary to form a spinel. For example, in various embodiments as otherwise described here, the molar ratio of Zn atoms to Al atoms is at least 1.1:1, e.g., at least 1.15:1 or at least 1.2:1. In various embodiments, the molar ratio of Zn atoms to Al atoms is at least 1.25:1, e.g., at least 1.3:1, or at least 1.35:1. In various embodiments, the molar ratio of Zn atoms to Al atoms is at least 1.4:1, e.g., 1.45:1 or 1.5:1. Of course, in order to provide a desirable amount of spinel, it is desirable that the ratio not be too high. In various embodiments, the molar ratio of Zn atoms to Al atoms in the composition is no more than 2.5:1, e.g., no more than 2.25:1, or no more than 2:1, or no more than 1.75:1. In various embodiments, the molar ratio of Zn atoms to Al atoms in the composition is in the range of 1:1-2.5:1, e.g., 1:1-2.25:1, or 1:1-2:1, or 1:1-1.75:1. In various embodiments, the molar ratio of Zn atoms to Al atoms is in the range of 1:1-2.5:1, e.g., 1:1-2.25:1, or 1:1-2:1, or 1:1-1.75:1, or 1.15:1-2.5:1, or 1.15:1-2.25:1, or 1.15:1-2:1, or 1.15:1-1.75:1, or 1.25:1-2.5:1, or 1.25:1-2.25:1, or 1.25:1-2:1, or 1.25:1-1.75:1, or 1.35:1-2.5:1, or 1.35:1-2.25:1, or 1.35:1-2:1, or 1.35:1-1.75:1, or 1.45:1-2.5:1, or 1.45:1-2.25:1, or 1.45:1-2:1, or 1.45:1-1.75:1. The present inventors have determined that various such Zn/Al ratios can provide a catalyst composition containing not only a $ZnAl_2O_4$ spinel phase but also significant amounts of a ZnO phase. The present inventors have found that the excess ZnO can be beneficial for the long-term performance of the catalyst composition. In commercial water-gas shift reactors, the feed often contains ppb levels of sulfur. Sulfur is known to irreversibly deactivate water-gas shift catalysts. The inventors have found that that catalyst formulations with an increased Zn/Al ratio as described herein can have not only a higher initial activity but also a higher activity after exposure to sulfur under operating conditions, as compared to catalysts with lower Zn/Al ratios.

In various embodiments the catalyst compositions the disclosure have low to no amounts of a crystalline $Al_2O_3$ phase. For example, in various embodiments, the amount of crystalline $Al_2O_3$ phase in the catalyst composition is no more than 5 wt. %, e.g., no more than 4 wt. %, or no more than 3 wt. %, or no more than 2 wt. %, or no more than 1 wt %. In various embodiments, the catalyst composition includes an $Al_2O_3$ phase in an amount in the range of 1-6 wt. %, or 1-4 wt. %, or 1-3 wt. %, or 1-2 wt %. In various embodiments, the catalyst composition does not include any substantial amount of crystalline $Al_2O_3$ phase, e.g., no more than 0.5 wt %.

The present inventors note that a variety of promoters may also be present. For example, in various embodiments, the composition also includes one or more promoters, e.g., present in a total amount up to 20 wt. %, calculated as a most stable oxide. For example, in various embodiments, the one or more promoters are present in an amount in the range of 0.1-20 wt %, e.g., 0.1-15 wt %, or 0.1-10 wt %, or 0.1-5 wt %, or 1-20 wt %, or 1-15 wt %, or 1-10 wt %, or 1-5 wt %, or 5-20 wt %, or 5-15 wt %, or 5-10 wt %, or 10-20 wt %, or 10-15 wt %. In some embodiments of the present disclosure, the catalyst composition does not include more than 15 wt. % (e.g., more than 10 wt. %) of the one or more promoters.

The present inventors have found that activity of the catalysts can be increased with the addition of metals like Co, V, and Fe. Without intending to be bound by theory, the inventors note that these metals can form a solid solution with the Zn—Al spinel. Accordingly, in various embodiments as otherwise described herein, the catalyst composition includes one or more promoters selected from Co, V and Fe.

In some embodiments the one or more promoters include Co. For example, on some embodiments, Co is present in an amount of 0.1-20 wt. %, calculated as $Co_2O_3$. In a variety of embodiments, the Co in the composition is present in the composition in an amount of 0.1-15 wt %, or 0.1-10 wt %, or 0.1-5 wt %, or 1-20 wt %, or 1-15 wt %, or 1-10 wt %, or 1-5 wt %, or 5-20 wt %, or 5-15 wt %, or 5-10 wt %, or 10-20 wt %, or 10-15 wt %. In some embodiments, the catalyst composition does not include more than 15 wt. % (e.g., more than 10 wt. %) of Co.

In some embodiments the one or more promoters include V. For example, on some embodiments, V is present in an amount of 0.1-20 wt. %, calculated as $V_2O_3$. In a variety of embodiments, the V in the composition is present in the composition in an amount of 0.1-15 wt %, or 0.1-10 wt %, or 0.1-5 wt %, or 1-20 wt %, or 1-15 wt %, or 1-10 wt %, or 1-5 wt %, or 5-20 wt %, or 5-15 wt %, or 5-10 wt %, or 10-20 wt %, or 10-15 wt %. In some embodiments, the catalyst composition does not include more than 15 wt. % (e.g., more than 10 wt. %) of V.

In some embodiments the one or more promoters include Fe. For example, on some embodiments, Fe is present in an amount of 0.1-20 wt. %, calculated as $Fe_2O_3$. In a variety of embodiments, the Fe in the composition is present in the composition in an amount of 0.1-15 wt %, or 0.1-10 wt %, or 0.1-5 wt %, or 1-20 wt %, or 1-15 wt %, or 1-10 wt %, or 1-5 wt %, or 5-20 wt %, or 5-15 wt %, or 5-10 wt %, or 10-20 wt %, or 10-15 wt %. In some embodiments, the catalyst composition does not include more than 15 wt. % (e.g., more than 10 wt. %) of Fe.

The present inventors have noted that a variety of other promoters can be useful. For example, in various embodiments, the one or more promoters include Cu, e.g., present in the composition in an amount in the range of 0.1-20 wt %, calculated as CuO. In various embodiments, the Cu is present in the composition in an amount in the range of 0.1-15 wt %, or 0.1-10 wt %, or 0.1-5 wt %, or 1-20 wt %, or 1-15 wt %, or 1-10 wt %, or 1-5 wt %, or 5-20 wt %, or 5-15 wt %, or 5-10 wt %, or 10-20 wt %, or 10-15 wt %, calculated as CuO. In some embodiments, the catalyst composition does not include more than 15 wt. % (e.g., more than 10 wt. %) of Cu.

And in various embodiments, the one or more promoters include one or more of K, Cs and Mg. For example, in various embodiments, the one or more promoters include K, Cs and Mg, e.g., present in the composition in an amount in the range of 0.1-20 wt %, calculated as oxide. In various embodiments, the K, Cs and Mg is present in the composition in an amount in the range of 0.1-15 wt %, or 0.1-10 wt %, or 0.1-5 wt %, or 1-20 wt %, or 1-15 wt %, or 1-10 wt %, or 1-5 wt %, or 5-20 wt %, or 5-15 wt %, or 5-10 wt %, or 10-20 wt %, or 10-15 wt %, calculated as oxide. In some embodiments, the catalyst composition does not include more than 15 wt. % (e.g., more than 10 wt. %) of K, Cs and/or Mg.

As described above, chromium is conventionally used to provide water-gas shift catalysts with excellent activity, selectivity and stability at elevated temperatures. However, chromium is toxic and carcinogenic, and thus it is desirable to avoid its use where possible. The present inventors have found that the catalysts of the disclosure exhibit good activity and stability at high temperature, even without the presence of chromium. Thus, in various embodiments as otherwise described herein, the catalyst composition does not include any substantial amount of chromium, calculated as $Cr_2O_3$. In some embodiments, the catalyst composition does not include more than 1 wt. % of chromium, calculated as $Cr_2O_3$. For example, in various embodiments as otherwise described herein, the catalyst composition does not include more than 0.5 wt. %, or more than 0.1 wt. %, or more than 0.01 wt. % of chromium, calculated as $Cr_2O_3$.

The catalyst compositions described herein can be substantially made up of oxides of aluminum and zinc. For example, in various embodiments of the catalyst compositions as otherwise described herein, total amount of oxides of Al (calculated as $Al_2O_3$) and Zn (calculated as ZnO), Co (calculated as $Co_2O_3$), V (calculated as $V_2O_3$), and Fe (calculated as $Fe_2O_3$) is at least 90 wt. % of the catalyst composition, e.g., at least 95 wt. %. In other embodiments of the catalyst composition as otherwise described herein, the total amount of oxides Al (calculated as $Al_2O_3$) and Zn (calculated as ZnO), Cu (calculated as CuO), Co (calculated as $Co_2O_3$), V (calculated as $V_2O_3$), and Fe (calculated as $Fe_2O_3$) is at least 90 wt. % of the catalyst composition, e.g., at least 95 wt. %.

The present inventors have found that coprecipitation techniques can be used to make the zinc and aluminum mixed oxide catalysts of the disclosure. Other techniques such as impregnation can optionally be used to add additional species, for example, those not amenable to coprecipitation. Another aspect of the disclosure is a method of preparing a high temperature water-gas shift catalyst composition. The method includes providing an aqueous precursor solution comprising zinc ions and aluminum ions; precipitating a solid catalyst precursor comprising salts of zinc, aluminum and if present, promoter ions, from the aqueous precursor solution, and then calcining the solid catalyst precursor to provide the catalyst composition.

As described above, the method includes providing a precursor solution comprising zinc ions and aluminum ions. In various embodiments as described herein, providing the aqueous precursor solution comprises dissolving one or more salts containing zinc ions and aluminum ions in aqueous medium. For example, in various embodiments as described herein, the one or more salts may be selected from the group consisting of zinc nitrate, zinc sulfate, zinc carbonate, zinc acetate, zinc chloride, zinc bromide, zinc iodine, aluminum nitrate, aluminum sulfate, aluminum carbonate, aluminum acetate, aluminum chloride, aluminum bromide, and aluminum iodine. In various embodiments of the disclosure, the one or more salts containing zinc ions and aluminum ions have the same counterion. In other embodiments as otherwise described herein, the one or more salts containing zinc ions and aluminum ions have a different counterion. In particular embodiments of the disclosure as described herein, providing the precursor solution comprises dissolving zinc nitrate ($Zn(NO_3)_2$) and aluminum nitrate ($Al(NO_3)_2$) in aqueous medium.

As discussed above, the present inventors have found that a variety of promoters may be used to increase the activity of the catalyst. Thus, in various embodiment, the method includes providing the aqueous precursor solution that further comprises one or more promoter ions. For example, in some embodiments of the present disclosure, the one or more promoter ions is selected from cobalt ions, vanadium ions, iron ions, or copper ions. In various embodiments as described herein, providing the aqueous precursor solution comprises dissolving one or more promoter salts containing cobalt ions, vanadium ions, iron ions, and copper ions in aqueous medium. For example, in various embodiments as described herein, the one or more salts may be selected from the group consisting of cobalt nitrate, cobalt sulfate, cobalt carbonate, cobalt acetate, cobalt chloride, cobalt bromide, cobalt iodine, vanadium nitrate, vanadium sulfate, vanadium carbonate, vanadium acetate, vanadium chloride, vanadium bromide, vanadium iodine, iron nitrate, iron sulfate, iron carbonate, iron acetate, iron chloride, iron bromide, iron iodine, copper nitrate, copper sulfate, copper carbonate, copper acetate, copper chloride, copper bromide, and copper iodine. In various embodiments of the disclosure, the one or more salts containing cobalt ions, vanadium ions, iron ions, and copper ions have the same counterion. In other embodiments as otherwise described herein, the one or more salts containing cobalt ions, vanadium ions, iron ions, and copper ions have a different counterion. In particular embodiments of the disclosure as described herein, providing the precursor solution comprises dissolving one or more promoter ion nitrates in the aqueous medium. For example, in various embodiments, providing the precursor solution comprises dissolving one or more of $Co(NO_3)_2$, $VO(NO_3)_3$, $Fe(NO_3)_3$, and $Cu(NO_3)_3$ in aqueous medium.

As descried above, the method includes precipitating the solid catalyst precursor from the solution. The precipitation can be effected by bringing the pH of the solution in the range of 5 and 7.5. For example, in various embodiments of the methods as otherwise described herein, the pH of the precursor solution is brought to, e.g. 5-7.2, or 5-7, or 5-6.8, or 5-6.5, or 5-6.2, or 5-6, or 5.5-7.5, of 5.5-7.2, or 5.5-7, or 5.5-6.8, or 5.5-6.5, or 6-7.5, or 6-7.2, or 6-7, or 6.5-7.5, or 6.5-7.2. Such pH range can desirably be maintained throughout the precipitation.

In some embodiments of the methods as otherwise described herein, the precipitation step includes adding a basic solution comprising carbonate ions and hydroxide ions to the aqueous precursor solution. In some embodiments of the methods as otherwise described herein, the basic solution includes sodium carbonate (e.g., 15-35 wt. %, or 20-30 wt. %), and sodium hydroxide (e.g., 5-15 wt. %). Of course, other basic solutions can be used, e.g., using potassium carbonate and/or potassium hydroxide in place of their sodium analogs.

In various embodiments of the methods as otherwise described herein, the temperature of the precursor solution is maintained between 30° C. and 100° C., throughout the precipitation. For example, in various embodiments of the methods as otherwise described herein, the temperature of the precursor solution is maintained in the range of 30-100° C., e.g., between 30-90° C., or 30-80° C., or 40-100° C., or 40-90° C., or 40-80° C., or 50-100° C., or 50-90° C., or 50-80° C., throughout the precipitation.

The person of ordinary skill in the art can select a desired time course for the precipitation. In various embodiments of the methods as otherwise described herein, the precipitation is performed for a time in the range of 0.5-2 hours, e.g., in the range of 0.5-1.5 hours, or 0.5 to 1 hour, or 1-2 hours, or 1-1.5 hours, or 1.5-2 hours. For example, in particular embodiments, the precipitation takes 1 hour. But other times can be used.

In some embodiments of the methods as otherwise described herein, the method further comprises isolating and washing the solid catalyst precursor before calcining the solid catalyst precursor. Conventional methods can be employed, without particular limitation. The isolation can be by any desirable method to separate the solid precipitate from the liquid solution, e.g., filtration or centrifugation. Washing can be performed by rinsing with deionized water.

As described above, the method includes calcining the solid catalyst precursor. In some embodiments of the methods as otherwise described herein, the method further comprises aging, washing, and then drying the solid catalyst precursor before calcining the solid catalyst precursor. In some embodiments of the methods as otherwise described herein, the solid catalyst precursor is aged before calcination, for example, after isolation but before drying. In some embodiments of the methods as otherwise described herein, the solid catalyst precursor is aged for a time within the range of 5 minutes to 1 hour, e.g., in the range of 5 minutes to 45 minutes, or 5 minutes to 30 minutes, or 5 minutes to 15 minutes, or 15 minutes to 1 hour, or 15 minutes to 45 minutes, or 15 minutes to 30 minutes, or 30 minutes to 1 hour, or 30 minutes to 45 minutes, or 45 minutes to 1 hour.

In some embodiments of the methods as otherwise described herein, the solid catalyst precursor is dried before calcination. Here, too, conventional methods can be used, without particular limitation. In some embodiments of the methods as otherwise described herein, the solid catalyst precursor is dried at a temperature within the range of 40° C. to 200° C., for a period of time within the range of 15 min. to 36 hr. But the person of ordinary skill in the art will appreciate that other conditions can be used (e.g., allowing the material to dry under ambient conditions), and that separate drying steps may not be necessary for some samples as water will be removed during initial stages of the heating for calcination.

The material is calcined in order to convert the zinc and aluminum salts of the precipitate substantially to oxide, via treatment with oxygen (typically in air) at high temperature. In various embodiments of the methods as otherwise escribed herein, the temperature of the calcination is in the range of 200-1200° C. For example, in various embodiments of the methods as otherwise described herein, the temperature of the calcination is 300-1200° C., e.g., 300-1150° C., or 300-1100° C., or 300-1050° C., or 300-1000° C., or 350-1200° C., or 350-1150° C., or 350-1100° C., or 350-1050° C., or 350-1000° C. or 400-1200° C., or 400-1150° C., or 400-1100° C., or 400-1050° C., or 400-1000° C., or 450-1200° C., or 450-1150° C., or 450-1100° C., or 450-1050° C., or 450-1000° C., or 500-1200° C., or 500-1150° C., or 500-1100° C., or 500-1050° C., or 500-1000° C.

The person of ordinary skill in the art will select a calcination time sufficient to convert precipitate salts substantially to oxides as described above. In some embodiments of the methods as otherwise described herein, the solid catalyst precursor is calcined for a period of time within the range of 5 min. to 24 hr. For example, in various embodiments of the methods as otherwise described herein, the solid catalyst precursor is calcined for a period of time within the range of 5 min. to 12 hr., or 5 min. to 8 hr., or 1 hr. to 24 hr., or 1-12 hr., or 1-8 hr., or 2-24 hr., or 2-12 hr., or 2-8 hr.

As noted above with respect to the various aspects and embodiments of the catalyst compositions of the disclosure, the metal source other than Zn and Al (e.g., a Co, V, Fe, or Cu source) may be, for example, a carbonate, nitrate, acetate, formate, oxalate, molybdate, or citrate, or any compound that provides such promoter metals to the calcined catalyst composition. Certain of these species can be precipitated together with the zinc, and aluminum salts. In other embodiments of the methods as otherwise described herein, the method further comprises providing one or more of cobalt, vanadium, iron, and copper, to the composition by an impregnation step. In various embodiments of the methods as otherwise described herein, the method comprises impregnating the calcined composition by incipient wetness impregnation.

In various embodiments of the methods as otherwise described herein, a calcination step occurs before the impregnation step. In various embodiments of the methods as otherwise described herein, a calcination step occurs after the impregnation step. In various embodiments of the methods as otherwise described herein, a calcination step occurs both before and after the impregnation step. Post-impregnation drying and calcination can be performed, for example, at temperature and time ranges disclosed above for the calcination of the precipitate.

While particular methods are described here, the present inventors note that catalysts with the spinel structure can be prepared by various conventional routes. For example, catalysts can be prepared by conventional precipitation routes to produce layered double hydroxide or oxy-hydroxide structures. Thermal treatment of the precipitates yields the spinel structure. Different preparation methods (for example co-precipitation, acid/base addition, urea homogenous co-precipitation, Pechini method and citric acid complex method) can be applied to the catalyst synthesis. Zinc, magnesium, aluminum, copper, cobalt, vanadium, iron, manganese, cerium and other divalent and trivalent metal salts could be used in the synthesis of the catalyst, and can be provided by co-precipitation or by impregnation.

Another aspect of the disclosure is a catalyst composition prepared by a method as described herein. Advantageously, the present inventors have determined that use of such catalyst compositions can catalyze a high-temperature water-gas shift reaction at an efficiency comparable to conventional chromium-containing catalyst materials, and in certain embodiments can be operable under a wider range of steam-to-gas ratios relative to conventional catalyst materials.

The compositions described herein are especially useful in water-gas shift reactions, e.g., performed at relatively high temperatures. As the person of ordinary skill in the art understands, a water-gas shift reaction converts water and carbon monoxide to hydrogen and carbon dioxide. Accordingly, another aspect of the disclosure is a method for performing a water-gas shift reaction that includes contacting a feed comprising water and carbon monoxide with a catalyst composition as described herein under conditions to cause formation of hydrogen and carbon dioxide. The feed can be formed, for example, by the gasification of an organic feedstock such as coal or biomass.

In some embodiments of the water-gas shift methods as otherwise described herein, the feed includes water and gases (i.e., including carbon monoxide) in a molar steam-to-gas (S/G) ratio of at most 1. For example, in certain such embodiments, the S/G ratio of the feed is at most 0.8, or at most 0.6, or at most 0.5, or at most 0.4, or at most 0.3, or within the range of 0.2 to 1, or 0.4 to 1, or 0.5 to 1, or 0.6 to 1, or 0.7 to 1, or 0.1 to 0.6, or 0.2 to 0.7, or 0.3 to 0.8, or 0.4 to 0.9.

In certain such embodiments of the hydrogen formation methods as otherwise described herein, the feed includes carbon monoxide in an amount within the range of 5 wt. % to 25 wt. %. For example, in certain embodiments of the hydrogen formation methods as otherwise described herein, the feed includes carbon monoxide in an amount within the range of 5 wt. % to 20 wt. %, or 5 wt. % to 15 wt. %, or 10 wt. % to 25 wt. %, or 15 wt. % to 25 wt. %, or 10 wt. % to 20 wt. %, or 10 wt. % to 15 wt. %. In some embodiments of the hydrogen formation methods as otherwise described herein, the feed includes hydrogen. In some embodiments of the hydrogen formation methods as otherwise described herein, the feed includes carbon dioxide and/or nitrogen.

The contacting of the feed with the catalyst compositions described herein can be conducted in a variety of ways familiar to the person of ordinary skill in the art. Conventional equipment and processes can be used in conjunction with the catalyst compositions of the disclosure to provide beneficial performance. Thus, the catalyst may be contained in one bed within a reactor vessel or divided up amount a plurality of beds within a reactor. The reaction system may contain one or more reaction vessels in series. The feed to the reaction zone can flow vertically upwards, or downwards through the catalyst bed in a typical plug flow reactor, or horizontally across the catalyst bed in a radial flow type reactor.

The catalyst compositions described here are desirably in a substantially reduced form. Accordingly, it can be desirable to treat the catalyst composition with hydrogen, for example, before contacting the catalyst composition with the feed. Such treatment can be performed, for example, at a temperature within the range of 250° C. to 400° C. in flowing hydrogen, for example, having a GHSV within the range of 10,000 $h^{-1}$ to 30,000 $h^{-1}$ (e.g., within the range of 12,000 $h^{-1}$ to 24,000 $h^{-1}$) at a pressure within the range of 2 bar to 16 bar, for a time of at least 4 hours, for example, a time within the range of 8 hours to 24 hours.

The contacting of the feed with the catalyst composition can be performed using conventional methods. For example, the feed may be introduced into the reaction zone containing the catalyst composition at a constant rate, or alternatively, at a variable rate. The hydrogen formation can be conducted under vapor phase conditions.

In some embodiments of the hydrogen formation methods as otherwise described herein, the feed is contacted with the provided catalyst composition at a gas hourly space velocity within the range of 10,000 $h^{-1}$ to 30,000 $h^{-1}$. For example, in certain embodiments of the hydrogen formation methods as otherwise described herein, the feed is contacted with the provided catalyst composition at a gas hourly space velocity of 12,000 $h^{-1}$ to 30,000 $h^{-1}$, or 14,000 $h^{-1}$ to 30,000 $h^{-1}$, or 16,000 $h^{-1}$ to 30,000 $h^{-1}$, or 10,000 $h^{-1}$ to 28,000 $h^{-1}$, or 10,000 $h^{-1}$ to 26,000 $h^{-1}$, or 10,000 $h^{-1}$ to 24,000 $h^{-1}$, or 10,000 to 22,000 $h^{-1}$, or 10,000 $h^{-1}$ to 20,000 $h^{-1}$, or 12,000 $h^{-1}$ to 28,000 $h^{-1}$, or 14,000 $h^{-1}$ to 26,000 $h^{-1}$, or 16 $h^{-1}$ to 24,000 $h^{-1}$, or 16,000 $h^{-1}$ to 24,000 $h^{-1}$.

In some embodiments of the hydrogen formation methods as otherwise described herein, the method is carried out at a temperature within the range of 250° C. to 650° C. For example, in certain embodiments of the hydrogen formation methods as otherwise described herein, the method is carried out at a temperature within the range of 275° C. to 650° C., or 300° C. to 650° C., or 325° C. to 650° C., or 250° C. to 625° C., or 250° C. to 600° C., or 250° C. to 575° C., or 250° C. to 550° C., or 250° C. to 525° C., or 250° C. to 500° C., or 250° C. to 475° C., or 275° C. to 600° C., or 300° C. to 575° C., or 325° C. to 550° C., or 325° C. to 525° C., or 325° C. to 500° C.

In some embodiments of the hydrogen formation methods as otherwise described herein, the method is carried out at a pressure within the range of 5 barg to 40 barg. For example, in certain embodiments of the hydrogen formation methods as otherwise described herein, the method is carried out at a pressure within the range of 7.5 barg to 40 barg, or 10 barg to 40 barg, or 12.5 barg to 40 barg, or 15 barg to 40 barg, or 20 barg to 40 barg, or 25 barg to 40 barg, or 5 barg to 35 barg, or 5 barg to 30 barg, or 5 barg to 25 barg, or 5 barg to 20 barg, or 5 barg to 15 barg, or 7.5 barg to 35 barg, or 10 barg to 30 barg, or 12.5 barg to 25 barg.

For example, in certain embodiments as otherwise described herein, the water-gas shift reaction is a high-temperature shift reaction, e.g., performed at a temperature in the range of 300-450° C. In other embodiments as otherwise described herein, the water-gas shift reaction is a medium-temperature shift reaction, e.g., performed at a temperature in the range of 220-295° C. And in other embodiments as otherwise described herein, the water-gas shift reaction is a low-temperature shift reaction, e.g., performed at a temperature in the range of 180-220° C.

EXAMPLES

The Examples that follow are illustrative of specific embodiments of the compositions and methods of the disclosure, and various uses thereof. They are set forth for explanatory purposes only, and are not to be taken as limiting the scope of the disclosure.

Example 1: Catalyst Preparation with High Zn:Al Ratios

To prepare a high temperature water-gas shift catalyst with a high Zn:Al ratio, a precursor acid solution was prepared with 4.399 kg of $NaAlO_2$ (28.63% Al) powder was dissolved in 61.71 kg of DI water. Next, 32.464 kg of 67% $HNO_3$ was added to the sodium aluminate solution and mixed vigorously. Once well mixed, 5.753 kg of ZnO (80.26% Zn) was added to the aluminum nitrate solution and mixed until completely dissolved. Then, 1.998 kg of $Cu(NO_3)_2$ (14.95% Cu) solution was added to the Zn/Al solution and dissolved. The acid solution was then pumped to Tank #1 and the lines were flushed with 15 kg DI water. This entire process was repeated to make a double batch of acid solution and an additional 39 kg of DI water was added to the acid tank to target 226 Liters (264 kg). The target acid tank weight was 267 kg, and the actual weight was 264 kg. A base solution was prepared by dissolving 21.27 kg of $Na_2CO_3$ powder in 80.82 kg of DI water. Then 4.254 kg of 50% NaOH solution was added to the dissolved sodium carbonate solution. This entire process was repeated to make a double batch of base solution. The target base tank weight was 213 kg, and the actual weight was 214 kg.

The precursor acid and base solutions were pumped into a tank containing 159 kg DI water heated to 60° C. The solutions were mixed in the vessel, causing a precipitate to form. The solutions were pumped in for approximately one hour and the pH of the solution was 7 during the precipitation. Since this was a double batch, the coprecipitation process was repeated. Once all precursor acid solution was added for each batch, the stirred suspension was heated to 60° C. for 30 minutes. After 30 minutes aging, the suspension was filtered using a Shriver filter press and washed with deionized water such that the filtrate conductivity was below 200 μS. The final filtered cake was then re-slurried with an aqueous solution of $Mg(CH_3COO)_2$ and $K(CH_3COO)$. This impregnated slurry was spray dried, then calcined at 450° C. for two hours. The calcined powder was mixed with graphite, tableted and the tablets were calcined at 600° C. to provide catalyst E1.

Two comparative catalysts were also prepared. To prepare these catalysts, a precursor acid solution was prepared by dissolving 74.2 g of $NaAlO_2$ (28.5% Al) powder in 500 mL of DI water. This solution was then mixed with 461.8 g of 58% $HNO_3$. Next, 31.73 g of ZnO (80.35% Zn) powder was dissolved in the solution. Once the ZnO had completely dissolved, 9.69 g of $Cu(NO_3)_2$ (27.22% Cu) crystals were added to the solution and dissolved. Finally, 185 g of DI water was added to dilute the total solution volume to 1 L. A base solution was prepared by mixing 240 g of 10% NaOH solution and 960 g of 25% $Na_2CO_3$ solution. This yields approximately 1 L of base solution.

The precursor acid and base solutions were pumped into a jacketed vessel containing DI water heated to 60° C. The solutions were mixed in the vessel, causing a precipitate to form. The solutions were pumped in for approximately one hour and the pH of the solution was 7 during the precipitation. Once all precursor acid solution was added, the stirred suspension was heated to 60° C. for 30 minutes. After 30 minutes aging, the suspension was filtered and washed with deionized water such that the filtrate conductivity was below 200 μS. The final filtered cake was then dried at 120° C. The dried filter cake was ground into a powder and impregnated with an aqueous solution of $Mg(CH_3COO)_2$ and $K(CH_3COO)$. This impregnated powder was dried at 120° C., then calcined at 450° C. for two hours. The calcined powder was mixed with graphite, tableted and the tablets were calcined at 600° C. to provide comparative catalyst C1.

The second comparative catalyst was prepared with a precursor acid solution was prepared by dissolving 73.2 g of $NaAlO_2$ (28.9% Al) powder in 500 mL of DI water. This solution was then mixed with 453.3 g of 58% $HNO_3$. Next, 31.73 g of ZnO (80.35% Zn) powder was dissolved in the solution. Once the ZnO had completely dissolved, 9.78 g of $Cu(NO_3)_2$ (26.96% Cu) crystals were added to the solution and dissolved. Finally, 208 g of DI water was added to dilute the total solution volume to 1 L. A base solution was prepared by mixing 240 g of 10% NaOH solution and 960 g of 25% $Na_2CO_3$ solution. This yields approximately 1 L of base solution.

The precursor acid and base solutions were pumped into a jacketed vessel containing DI water heated to 60° C. The solutions were mixed in the vessel, causing a precipitate to form. The solutions were pumped in for approximately one hour and the pH of the solution was 7 during the precipitation. Once all precursor acid solution was added, the stirred suspension was heated to 60° C. for 30 minutes. After 30 minutes aging, the suspension was filtered and washed with deionized water such that the filtrate conductivity was below 200 μS. The final filtered cake was then dried at 120° C. The dried filter cake was ground into a powder and impregnated with an aqueous solution of $Mg(CH_3COO)_2$ and $K(CH_3COO)$. This impregnated powder was dried at 120° C., then calcined at 450° C. for two hours. The calcined powder was mixed with graphite, tableted and the tablets were calcined at 600° C. to provide comparative catalyst C2.

Catalyst E1, C1, and C2 were analyzed with XRD to determine their compositions, the results of which are reported in Table 1.

TABLE 1

Catalyst Compositions

| | Zn/Al | $ZnAl_2O_4$ % | $ZnAl_2O_4$ size (nm) | a(Å) | ZnO % | ZnO size (nm) |
|---|---|---|---|---|---|---|
| E1 | 1.5 | 58% | 7 nm | 8.089 | 42% | 14 nm |
| C1 | 0.5 | 98% | 7 nm | 8.102 | 2% | — |
| C2 | 0.5 | 99% | 7 nm | 8.104 | 1% | — |

Example 2: Performance of High Zn:Al Ratio Catalysts

All examples were first reduced at 330° C. at 3.4 barg for 16 h with the feed gas and tested in a fixed-bed test unit under typical high temperature water-gas shift conditions. In the tests, a simulated feed containing 23.2% $N_2$, 12.8% CO, 7.8% $CO_2$, and balance hydrogen was passed over the catalyst bed at dry Gas Hourly Space Velocity (GHSV) of 12,500 $h^{-1}$ with a S/G ratio of 0.6 and 29 barg in total pressure. To determine the sulfur tolerance of the catalysts, tests were also conducted with 15 ppm $H_2S$ introduced to the feed gas. The bed temperature was gradually increased from 330° C. to 371° C. The CO concentration at the reactor outlet was monitored with an on-line gas chromatograph (GC). The average CO conversion at 330° C. and 371° C. is listed in Table 2 for each test.

TABLE 2

Performance of High Zn:Al ratio Catalyst

| Trial No. | Sample | Zn/Al | Reaction Conditions | Sulfur | CO conversion |
|---|---|---|---|---|---|
| 1 | E1 | 1.5 | 330° C. (50 psig) | 0 | 59.52 |
| 2 | E1 | 1.5 | 330° C. (400 psig) | 0 | 70.61 |
| 3 | E1 | 1.5 | 371° C. (400 psig) | 0 | 65.22 |
| 4 | C2 | 0.5 | 330° C. (50 psig) | 0 | 50.95 |
| 5 | C2 | 0.5 | 330° C. (400 psig) | 0 | 65.91 |
| 6 | C2 | 0.5 | 371° C. (400 psig) | 0 | 62.04 |
| 7 | E1 | 1.5 | 330° C. (50 psig) | 15 ppm $H_2S$ | 28.66 |
| 8 | E1 | 1.5 | 330° C. (400 psig) | 15 ppm $H_2S$ | 34.18 |
| 9 | E1 | 1.5 | 371° C. (400 psig) | 15 ppm $H_2S$ | 41.52 |
| 10 | C1 | 0.5 | 330° C. (50 psig) | 15 ppm $H_2S$ | 17.13 |

TABLE 2-continued

Performance of High Zn:Al ratio Catalyst

| Trial No. | Sample | Zn/Al | Reaction Conditions | Sulfur | CO conversion |
|---|---|---|---|---|---|
| 11 | C1 | 0.5 | 330° C. (400 psig) | 15 ppm $H_2S$ | 23.15 |
| 12 | C1 | 0.5 | 371° C. (400 psig) | 15 ppm $H_2S$ | 31.04 |

Example 3: Catalyst Preparation and Performance with V and Fe Promoters

A series of X-ray powder diffraction experiments were carried out on spent catalysts to probe the structure of the active species responsible for the activity enhancement.

Three promoter free materials were prepared by coprecipitation with Zn/Al=1, 1.25 and 1.5 (E2, E3, E4). The powders were calcined at 1000° C. XRD was used to analyze these structure prior to use in the reactor. All three samples contain $ZnAl_2O_4$ spinel and ZnO. The relative amount of the two phases changes with the Zn/Al ratio in the formulation (Table 3). Since Zn is in excess in all three samples the unit cell dimensions and thus the composition of the spinel does not change.

TABLE 3

Catalyst Compositions

| Sample | Zn/Al | $ZnAl_2O_4$ % | $ZnAl_2O_4$ size (nm) | a(Å) | ZnO % | ZnO size (nm) | (Å) | Rwp |
|---|---|---|---|---|---|---|---|---|
| E2 | 1 | 73% | 74 nm | 8.0879 | 27% | 63 nm | A = 3.2398<br>C = 5.2057 | 7 |
| E3 | 1.25 | 64% | 76 nm | 8.0909 | 36% | 98 nm | A = 3.2514<br>C = 5.2059 | 5 |
| E4 | 1.5 | 61% | 65 nm | 8.0881 | 39% | 83 nm | A = 3.2497<br>C = 5.2061 | 5 |

Catalysts including vanadium and iron promoters were also prepared and then tested for their high temperature water-gas shift performance. The spent vanadium promoter catalysts (E5 and E6) and spent iron promoter catalysts (E7, E8, and E9) were analyzed with XRD to determine their compositions, the results of which are reported in Table 4. A comparative catalyst with high amounts of iron (C3) was also prepared and analyzed.

TABLE 4

Catalyst Compositions with Promoters

| Sample | Promoter | Promoter wt. % | Zn/Al | $ZnAl_2O_4$ % | $ZnAl_2O_4$ size (nm) | a(Å) | ZnO % | ZnO size (nm) | (Å) | Rwp |
|---|---|---|---|---|---|---|---|---|---|---|
| E5 (spent) | V | 14% | 1.125 | 85% | 10 nm | 8.2039 | 15% | 26 nm | A = 3.2493<br>C = 5.2050 | 8 |
| E6 (spent) | V | 9.4% | 1 | 93% | 10 nm | 8.1619 | 17% | 24 nm | A = 3.2488<br>C = 5.2050 | 7 |
| E7 (spent) | Fe | 10.5% | 1 | 78% | 11 nm | 8.1630 | 22% | 32 nm | A = 3.2511<br>C - | |
| E8 (spent) | Fe | 6.2% | 1.9 | 50% | 9 nm | 8.1639 | 50% | 31 nm | A = 3.2507<br>C = 5.2068 | 4.3 |
| E9 (spent | Fe | 2.8% | 1.6 | 52% | 9 nm | 8.1198 | 48% | 30 nm | A = 3.2499<br>C = | 5.4 |

TABLE 4-continued

| Catalyst Compositions with Promoters | | | | | | | | | | |
|---|---|---|---|---|---|---|---|---|---|---|
| Sample | Promoter | Promoter wt. % | Zn/Al | $ZnAl_2O_4$ % | $ZnAl_2O_4$ size (nm) | a(Å) | ZnO % | ZnO size (nm) | (Å) | Rwp |
| | | | | | | | | | 5.2061 | |
| E4 (spent) | — | — | 1.5 | 59% | 10 nm | 8.0911 | 41% | 40 nm | A = 3.2500 C = 5.2055 | 5.9 |
| C3 (spent) | Fe | 34.4 | 1.1 | 95% | 22 nm | 8.314 | 4% | — | A = 3.2511 C = 5.2080 | 2 |

FIG. 1 shows the XRD patterns of the un-promoted (E4) and V-promoted (E5 and E6) spent catalysts. All three samples contain broad peaks related to the spinel structure. The unit cell dimensions of the spinel phase in the unpromoted sample (E4) matches the literature value for $ZnAl_2O_4$ (a=8.0869 Å) quite closely. The spinel unit cell size of the V promoted samples increases significantly with increasing V content (Table 4). This phenomenon could be explained by the different ionic radii of $A13^+$ and $V^{3+}$ in crystals. Table 5 lists the ionic radii of various metals in crystals with different coordination numbers. When a larger cation such as $V^{3+}$ replaces $Al^{3+}$ in the octahedral B lattice in the $AB_2O_4$ spinel structure, the unit cell expansion occurs and the corresponding peaks shift to the lower angle. The high temperature water-gas shift testing results indicate that the V-promoted samples had higher CO conversion at 371° C. and S/G=0.6 than the un-promoted catalyst and the activity enhancement is more significant with higher vanadium content.

TABLE 5

| Ionic Radii of Metals in Crystals | | |
|---|---|---|
| Ionic radii in crystals | Å(CN) | |
| $Al^{3+}$ | 0.39(4) | 0.54(6) |
| $Zn^{2+}$ | 0.60(4) | 0.74(6) |
| $Co^{3+}$ | | 0.55(6) |
| $V^{3+}$ | | 0.64(6) |
| $Fe^{3+}$ | 0.49(4) | 0.55(6) |

Figure 2:
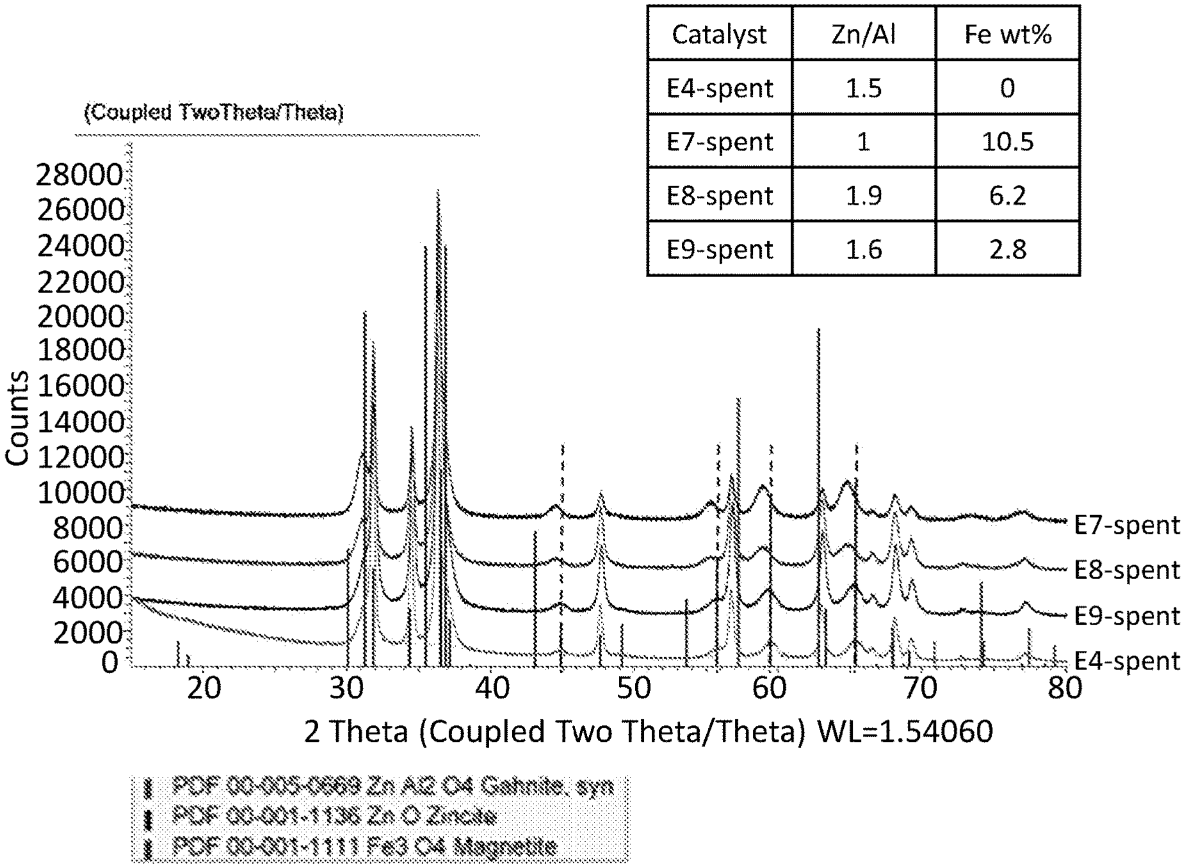
FIG. 2. is a plot of the X-ray diffraction (XRD) patterns of certain materials described herein.

Similar phenomenon was observed in the Fe-promoted catalysts (E7, E8, E9). FIG. 2 shows the XRD patterns of the un-promoted (E4) and Fe-promoted (E7, E8, E9) spent catalysts. The unit cell size of the spinel phase increased (Table 4) with higher Fe levels the formulation indicating that the Fe is incorporated into the ZnAl spinel phase (FIG. 2).

The catalyst with very high Fe level of 34.4% Fe (C3) was prepared. After the high temperature water-gas shift reaction C3 also contain a cubic spinel phase with a large unit cell size (Table 4). This phase is best described by an aluminum substituted zinc iron oxide ($ZnFe_{1.5}Al_{0.5}O_4$, 04-007-6615). Sample C3 also contains a trace amount of hematite. The testing results indicate that those high Fe level samples had lower CO conversion and a much higher methane make at 371° C. and S/G=0.6 than samples containing less than 10% Fe.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice. Thus, before the disclosed processes and devices are described, it is to be understood that the aspects described herein are not limited to specific embodiments, apparatuses, or configurations, and as such can, of course, vary. It is also to be understood that the terminology used herein is for the purpose of describing particular aspects only and, unless specifically defined herein, is not intended to be limiting.

The terms “a,” “an,” “the” and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. It will be further understood that the endpoints of each of the ranges are significant both in relation to the other endpoint, and independently of the other endpoint.

All methods described herein can be performed in any suitable order of steps unless otherwise indicated herein or otherwise clearly contradicted by context. The use of any and all examples, or exemplary language (e.g., “such as”) provided herein is intended merely to better illuminate the invention and does not pose a limitation on the scope of the invention otherwise claimed. No language in the specification should be construed as indicating any non-claimed element essential to the practice of the invention.

Unless the context clearly requires otherwise, throughout the description and the claims, the words ‘comprise’, ‘comprising’, and the like are to be construed in an inclusive sense as opposed to an exclusive or exhaustive sense; that is to say, in the sense of “including, but not limited to”. Words using the singular or plural number also include the plural and singular number, respectively. Additionally, the words “herein,” “above,” and “below” and words of similar import, when used in this application, shall refer to this application as a whole and not to any particular portions of the application.

As will be understood by one of ordinary skill in the art, each embodiment disclosed herein can comprise, consist essentially of or consist of its particular stated element, step, ingredient or component. As used herein, the transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment.

Unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Some embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Numerous references have been made to patents and printed publications throughout this specification. Each of the cited references and printed publications are individually incorporated herein by reference in their entirety.

Furthermore, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

We claim:

1. A high temperature water-gas shift catalyst composition comprising:

a zinc-aluminum spinel phase, present in the composition in an amount of 30-95 wt. %; and a ZnO phase, present in the composition in an amount of 5-70 wt. %;

wherein the molar ratio of Zn atoms to Al atoms in the catalyst composition is at least 1:1.

2. The catalyst composition of claim 1, wherein the zinc-aluminum spinel phase is present in the composition in an amount in the range of 30-90 wt. %.

3. The catalyst composition of claim 1, wherein the zinc-aluminum spinel phase is present in the composition in an amount in the range of 40-95 wt. %.

4. The catalyst composition of claim 1, wherein the zinc-aluminum spinel phase is present in the composition in an amount in the range of 45-95 wt. %.

5. The catalyst composition of claim 1, wherein the zinc-aluminum spinel phase is present in the composition in an amount in the range of 50-95 wt. %.

6. The catalyst composition of claim 1, wherein the zinc-aluminum spinel phase has an average crystallite size in the range of 1-100 nm.

7. The catalyst composition of claim 1, wherein the ZnO phase is present in an amount in the range of 5-60 wt. %.

8. The catalyst composition of claim 1, wherein the ZnO phase is present in an amount in the range of 15-70 wt. %.

9. The catalyst composition of claim 1, wherein the ZnO phase is present in an amount in the range of 25-70 wt. %.

10. The catalyst composition of claim 1, wherein the ZnO phase is present in an amount in the range of 30-70 wt. %.

11. The catalyst composition of claim 1, wherein the ZnO phase is present in an amount in the range of 35-70 wt. %.

12. The catalyst composition of claim 1, wherein the ZnO phase has an average crystallite size in the range of 1-100 nm.

13. The catalyst composition of claim 1, wherein the molar ratio of Zn atoms to Al atoms in the catalyst composition is at least 1.1:1.

14. The catalyst composition of claim 1, wherein the molar ratio of Zn atoms to Al atoms in the catalyst composition is at least 1.25:1.

15. The catalyst composition of claim 1, wherein the molar ratio of Zn atoms to Al atoms in the catalyst composition is at least 1.4:1.

16. The catalyst composition of claim 1, wherein the molar ratio of Zn atoms to Al atoms in the catalyst composition is no more than 2.5:1.

17. The catalyst composition of claim 1, wherein the molar ratio of Zn atoms to Al atoms in the catalyst composition is in the range of 1:1-2.5:1.

18. The catalyst composition of claim 1, having an amount of crystalline Al2O3 that is no more than 5 wt. %.

19. The catalyst composition of claim 1, having no more than 0.5 wt % of crystalline Al2O3.

20. The catalyst composition of claim 1, further comprising one or more promoters, e.g., present in a total amount up to 20 wt. %, calculated as a most stable oxide.

21. The catalyst composition of claim 20, wherein the one or more promoters are present in a total amount in the range of 0.1-15 wt %.

22. The catalyst composition of claim 20, wherein the catalyst composition does not include more than 15 wt. % of the one or more promoters.

23. The catalyst composition of claim 20, wherein the one or more promoters include Co, present in the composition in an amount of 0.1-20 wt. %, calculated as Co2O3.

24. The catalyst composition of claim 23, wherein the Co is present in the composition in an amount of 0.1-15 wt %.

25. The catalyst composition of claim 23, wherein the catalyst composition does not include more than 15 wt. % of Co.

26. The catalyst composition of claim 20, wherein the one or more promoters include V, present in the composition in an amount of 0.1-20 wt. %, calculated as V2O3.

27. The catalyst composition of claim 26, wherein the V is present in the composition in an amount of 0.1-15 wt %.

28. The catalyst composition of claim 26, wherein the catalyst composition does not include more than 15 wt. % of V.

29. The catalyst composition of claim 20, wherein the one or more promoters include Fe, present in the composition in an amount of 0.1-20 wt. %, calculated as Fe2O3.

30. The catalyst composition of claim 29, wherein the Fe is present in the composition in an amount of 0.1-15 wt %.

31. The catalyst composition of claim 29, wherein the catalyst composition does not include more than 15 wt. % of Fe.

32. The catalyst composition of claim 20, wherein the one or more promoters include Cu, present in the composition in an amount of 0.1-20 wt. %, calculated as CuO.

33. The catalyst composition of claim 32, wherein the Cu is present in the composition in an amount of 0.1-15 wt %.

34. The catalyst composition of claim 32, wherein the catalyst composition does not include more than 15 wt. % of Cu.

35. The catalyst composition of claim 20, wherein the one or more promoters include one or more of K, Cs and Mg.

36. The catalyst composition of claim 1, wherein the catalyst composition does not include any substantial amount of chromium, calculated as Cr2O3.

37. The catalyst composition of claim 1, wherein the catalyst composition does not include more than 1 wt. % of chromium, calculated as Cr2O3.

38. The catalyst composition of claim 1, wherein the total amount of oxides of Al (calculated as Al2O3) and Zn (calculated as ZnO), Co (calculated as Co2O3), V (calculated as V2O3), and Fe (calculated as Fe2O3) is at least 90 wt. % of the catalyst composition.

39. A method for preparing a high temperature water-gas shift catalyst composition according to claim 1, the method comprising providing a aqueous precursor solution comprising zinc ions and aluminum ions;

precipitating a solid catalyst precursor comprising salts of zinc, aluminum and if present, promoter ions, from the aqueous precursor solution; and then calcining the solid catalyst precursor to provide the catalyst composition.

40. The method of claim 39, wherein providing the precursor solution comprises dissolving Zn(NO3)2 and Al(NO3)3 in an aqueous medium.

41. The method of claim 39, wherein the aqueous precursor solution further comprises one or more promoter ions, selected from cobalt ions, vanadium ions, iron ions, or copper ions.

42. The method of claim 40, wherein providing the precursor solution comprises dissolving one or more promoter ion nitrates in the aqueous medium, wherein the one or more promoter ion nitrates selected from Co(NO3)2, VO(NO¬3)3, Fe(NO¬3)3, and Cu(NO¬3)3.

43. The method of claim 39, wherein the temperature of the precursor solution is maintained between 30° C. and 100° C. throughout the precipitation.

44. The method of claim 39, further comprising aging, washing, and then drying the solid catalyst precursor before calcining the solid catalyst precursor.

45. The method of claim 39, wherein the temperature of the calcination is 200-1200° C.

46. A catalyst composition of claim 1, made by a method of providing an aqueous precursor solution comprising zinc ions and aluminum ions;

precipitating a solid catalyst precursor comprising salts of zinc, aluminum and if present, promoter ions, from the aqueous precursor solution; and then calcining the solid catalyst precursor to provide the catalyst composition.

47. A method for performing a water-gas shift reaction, the method comprising contacting a feed comprising water and carbon monoxide with the catalyst composition of claim 1 to form hydrogen and carbon dioxide.

48. A method according to claim 47, wherein the steam-to-gas ratio of the feed is at most 1.

49. A method according to claim 47, wherein the feed is contacted with the catalyst composition at a temperature within the range of 250° C. to 650° C.

50. A method according to claim 47, wherein the feed is contacted with the catalyst composition at a pressure within the range of 5 barg to 40 barg.

* * * * *